Patented Dec. 27, 1949

2,492,614

UNITED STATES PATENT OFFICE 2,492,614

ALDEHYDES AND METHOD OF THEIR PREPARATION

George J. Benoit, Jr., San Anselmo, Calif., assignor to Hercules Powder Company, Wilmington, Del., a corporation of Delaware No Drawing. Application April 4, 1947, Serial No. 739,361

6 Claims. (Cl. 260—100)

This invention relates to new aldehydes and the method of producing these compounds and more particularly to hydroabietaldehydes.

In accordance with this invention, it has been found that a new class of aldehydes, the hydroabietaldehydes, may be prepared by contacting hydroabietyl alcohol with a copper chromite catalyst at an elevated temperature in the presence of a hydrogen acceptor and at superatmospheric pressure.

The following examples are illustrative of the process for preparing the new aldehydes in accordance with this invention. All parts and percentages are by weight unless otherwise indicated.

Example I

A zinc, nickel, barium-promoted copper chromite catalyst was prepared as follows: A solution of 144 parts of copper nitrate, 174 parts of nickel nitrate, 179 parts of zinc nitrate, 52 parts of barium nitrate, and 6 parts of nitric acid in 1800 parts of water, was heated to 80° C. and added to a solution of 252 parts of ammonium dichromate and 380 parts of concentrated ammonium hydroxide in 1800 parts of water. This mixture was allowed to stand for one hour in a cold water bath, after which the precipitate was filtered, the filter cake washed with water and dried at 105°–110° C. for 30 hours. The dried and pulverized filter cake was decomposed by heating on a hot plate and then in a muffle oven at 400° C. for 2 minutes. The resulting powder was stirred with 1200 parts of 5% acetic acid at room temperature for 5 minutes. The catalyst was then filtered, washed with water, dried at 105° C., pulverized, and again dried at 105° C. A yield of 250 parts of the catalyst was obtained. The catalyst had a specific surface of 80 square meters per gram.

Two hundred parts of hydroabietyl alcohol (92% purity) and 20 parts of the above catalyst were charged to a stainless steel bomb. After flushing the bomb with nitrogen, ethylene was added to a pressure of 600 lb./sq. in. The bomb was heated to 260° C. for 3 hours and then cooled to 100° C. The catalyst was removed by filtration and 165.5 parts of a crude hydroabietaldehyde containing 6.2% carbonyl and 0.5% hydroxyl were obtained. This represents a yield of 76% of the theoretical yield.

Example II

An unpromoted copper chromite catalyst was prepared by adding copper carbonate to a warm solution of ammonium dichromate, adding ammonium hydroxide, evaporating to dryness, and then decomposing by heat. The catalyst so prepared was ground to pass 100 mesh.

Two hundred parts of hydroabietyl alcohol (89% purity) and 20 parts of the above catalyst were charged to a stainless steel bomb. After flushing out the bomb with nitrogen, ethylene was added to a pressure of 600 lb./sq. in. and the bomb was heated to 260° C. for 3 hours. The bomb was cooled to 100° C. and the catalyst was removed by filtration. A yield of 178.7 parts of crude hydroabietaldehyde containing 5.0% carbonyl and 1.4% hydroxyl was obtained which corresponds to a conversion of 58% and a yield of 76%.

Example III

A calcium, barium-promoted copper chromite catalyst was prepared by dissolving calcium, barium, and copper carbonates in a warm solution of ammonium dichromate, adding ammonium hydroxide, and drying. The dried mixture was then ground, decomposed by heating, and again ground to pass 100 mesh.

Five hundred parts of hydroabietyl alcohol (89% purity) and 50 parts of the above catalyst were charged to a nickel hydrogenation bomb. The bomb was flushed with nitrogen and then ethylene was added to a pressure of 700 lb./sq. in. The bomb was heated to 285° C. and held at that temperature for 3 hours. After cooling to 125° C., the catalyst was removed by filtration and 468 parts of crude hydroabietaldehyde containing 5.26% carbonyl and 1.05% hydroxyl were obtained, which represents a conversion of 65% and a yield of 75% of the theoretical yield based on the amount of alcohol converted.

Example IV

A calcium-promoted copper chromite catalyst was prepared by adding calcium and copper carbonate to a warm solution of ammonium dichromate, adding ammonium hydroxide, and, after drying, decomposing by heat.

Five hundred parts of hydroabietyl alcohol (87% purity) and 50 parts of the above calcium-promoted copper chromite catalyst were charged to a carbon steel bomb. After flushing the bomb with nitrogen, ethylene was added to a pressure of 600 lb./sq. in. The bomb was heated to 285° C. and held at that temperature for 3 hours and then cooled to 125° C. The reaction mixture was filtered to remove the catalyst and 409 parts of hydroabietaldehyde containing 5.96% carbonyl and 0.3% hydroxyl were obtained. This corresponds to a conversion of 69% and a yield of 74%.

Example V

A barium-promoted copper chromite catalyst was prepared by the method described in Example IV except that barium carbonate was substituted for the calcium carbonate used in that example.

Two hundred parts of hydroabietyl alcohol (92% purity) and 20 grams of the barium-promoted copper chromite catalyst were charged to a stainless steel bomb. After flushing the bomb with nitrogen, ethylene was added to a pressure of 600 lb./sq. in. and the bomb was heated to 260° C. for 3 hours. After cooling to 100° C., the catalyst was removed by filtration and 172 parts of crude hydroabietaldehyde containing 4.48% carbonyl and 1.2% hydroxyl were obtained. This corresponds to a conversion of 50% and a yield of 62%.

Example VI

A lithium-promoted copper chromite catalyst was prepared as described in Example IV except that lithium carbonate was substituted for the calcium carbonate used in that example.

Two hundred parts of hydroabietyl alcohol (92% purity) and 20 parts of the lithium-promoted copper chromite catalyst were charged to a stainless steel bomb. After flushing the bomb with nitrogen, ethylene was added to a pressure of 600 lb./sq. in. and the bomb was heated to 260° C. for 3 hours. After cooling to 100° C., the catalyst was removed by filtration and 143.5 parts of crude hydroabietaldehyde containing 4.1% carbonyl and 1.8% hydroxyl were obtained. This corresponds to a conversion of 46% and a yield of 67% of the theoretical.

Example VII

Five hundred parts of hydroabietyl alcohol (89% purity) and 50 parts of copper chromite catalyst (prepared as described in Example II) were charged to a nickel bomb. The bomb was flushed with nitrogen and then filled with ethylene to a pressure of 700 lb./sq. in. The bomb was heated to 285° C. and held at that temperature for 3 hours. After cooling to 125° C., the reaction mixture was filtered to remove the catalyst. A yield of 420 parts of hydroabietaldehyde containing 3.72% carbonyl and 2.3% hydroxyl was obtained. This corresponds to a conversion of 44% and a yield of 72% of the theoretical.

Example VIII

One hundred fifty parts of hydroabietyl alcohol (87% purity) and 15 parts of copper chromite catalyst (prepared as described in Example II) were charged to a high pressure bomb. After flushing the bomb with nitrogen it was filled with ethylene to a pressure of 600 lb./sq. in., heated to 300° C., and held at this temperature for 3 hours. The catalyst was removed by filtration and a yield of 80.3 parts of hydroabietaldehyde containing 5.18% carbonyl and 0.8% hydroxyl was obtained. This corresponds to a conversion of 61% and a yield of 70% of the theoretical.

The hydroabietyl alcohol from which the hydroabietaldehydes are prepared in accordance with this invention are readily prepared by the catalytic hydrogenolysis of resin acid esters or by the direct hydrogenation of resin acids. The hydroabietyl alcohol used may be a pure dihydroabietyl alcohol or tetrahydroabietyl alcohol or the crude mixture of these two such as is found in commercial hydroabietyl alcohol. Thus, if pure dihydroabietaldehyde is desired, it is preferable to use dihydroabietyl alcohol as the starting material or tetrahydroabietyl alcohol if the tetrahydroabietaldehyde is desired. For most purposes, the mixture of di- and tetra-hydroabietaldehydes obtained from commercial hydroabietyl alcohol is suitable.

The aldehydes, named herein as the hydroabietaldehydes, or specifically dihydroabietaldehyde and tetrahydroabietaldehyde, are the aldehydes obtained when the —CH$_2$OH group of hydroabietyl alcohol is oxidized, as, for example, by dehydrogenation, to the —CHO group.

The reaction in accordance with this invention is carried out by contacting the hydroabietyl alcohol with a copper chromite catalyst, in the presence of a hydrogen acceptor, at an elevated temperature and under superatmospheric pressure. Any hydrogen acceptor may be used in carrying out the reaction, as, for example, an unsaturated hydrocarbon such as ethylene, propylene, etc. The hydrogen acceptor may be used alone or in combination with a gas inert under the conditions of the reaction, such as nitrogen, carbon dioxide, etc. Any superatmospheric pressure may be used as from about 100 lb./sq. in. up to about 5000 lb./sq. in. or higher. Pressures of from about 500 to 1000 lb./sq. in. have been found to give very rapid conversions. The reaction may be carried out at a temperature of from about 250° C. to about 350° C. and preferably is carried out at a temperature of about 260° C. to about 300° C.

The copper chromite catalyst used in carrying out the reaction may be a promoted or an unpromoted catalyst. Copper chromite catalysts promoted with barium, calcium, lithium, etc., or with a mixture of barium, zinc, and nickel are very effective catalysts for this reaction.

The crude hydroabietaldehyde may be purified by distillation in vacuo, removal of the unreacted hydroabietyl alcohol by conversion to the acid phthalate followed by extraction of the acid phthalate half ester with alkali, and by solvent extraction methods. The latter method may conveniently be carried out by distribution of the crude hydroabietaldehyde between a polar solvent, such as 90% methanol or furfural, and a nonpolar solvent such as hexane, whereby the aldehyde is held in the polar layer and may be separated therefrom by removal of the solvent.

On distillation in vacuo, nearly colorless, sticky, viscous oils are obtained which contain 70–75% hydroabietaldehyde. The fractions richest in aldehyde boil at 155°–165° C. at 0.5–0.6 mm. mercury. The aldehyde content was determined by refluxing a sample with an excess of hydroxylamine hydrochloride in an alcohol-pyridine solution. The pyridine hydrochloride formed was then titrated.

The hydroabietaldehydes obtained by the process in accordance with this invention are characterized by the formation of a crystalline semicarbazone which, after recrystallization, has a melting point of 197.5°–200.5° C. and of the 2,4-dinitrophenylhydrazone which, after recrystallization, has a melting point of 194.5°–195.2° C. Hydrolysis of the semicarbazone in a dilute acid solution in the presence of an excess of formaldehyde gives very viscous oils or low melting resins that are nearly colorless. Oxidation of the hydroabietaldehydes with potassium permanganate in acetone gives resin acids having titration curves analogous to those of known di- and tetra-hydroresin acids.

The hydroabietaldehydes prepared in accordance with this invention are useful as intermediates in the production of many compounds. They may be condensed with phenols and amines, or converted to derivatives such as the semicarbazone, the 2,4-dinitrophenylhydrazone, phenylhydrazone, oxime, etc. The hydroabietaldehydes are particularly valuable as intermediates in the preparation of hydroabietylamines by reductive amination.

What I claim and desire to protect by Letters Patent is:

1. An unsubstituted hydroabietaldehyde.
2. Dihydroabietaldehyde.
3. Tetrahydroabietaldehyde.
4. The process of preparing an unsubstituted hydroabietaldehyde which comprises contacting hydroabietyl alcohol with a copper chromite catalyst, in the presence of a hydrogen acceptor, at a temperature of about 250° C. to about 350° C. and under superatmospheric pressure.
5. The process of preparing an unsubstituted hydroabietaldehyde which comprises contacting hydroabietyl alcohol with a copper chromite catalyst, in the presence of a hydrogen acceptor, at a temperature of about 260° C. to about 300° C. and under superatmospheric pressure.
6. The process of preparing an unsubstituted hydroabietaldehyde which comprises contacting hydroabietyl alcohol with a copper chromite catalyst, in the presence of ethylene, at a temperature of about 260° C. to about 300° C. and under superatmospheric pressure.

GEORGE J. BENOIT, Jr.

REFERENCES CITED

The following references are of record in the file of this patent:

UNITED STATES PATENTS

| Number | Name | Date |
|---|---|---|
| 2,113,243 | Scott et al. | Apr. 5, 1938 |
| 2,367,002 | Campbell | Jan. 9, 1945 |

OTHER REFERENCES

Ruzicka et al., Helv. Chim. Acta. (1933), pp. 169–181.

Hansley, Ind. and Eng. Chem., vol. 39, pp. 55–62, Jan. 1947.